US009740210B2

(12) United States Patent
Sjöholm

(10) Patent No.: US 9,740,210 B2
(45) Date of Patent: Aug. 22, 2017

(54) ROBOTIC WORKING TOOL SYSTEM WITH A BOUNDARY WIRE

(71) Applicant: HUSQVARNA AB, Huskvarna (SE)

(72) Inventor: Ludvig Sjöholm, Gränna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/115,282

(22) PCT Filed: Jan. 30, 2014

(86) PCT No.: PCT/SE2014/050121
§ 371 (c)(1),
(2) Date: Jul. 29, 2016

(87) PCT Pub. No.: WO2015/115949
PCT Pub. Date: Aug. 6, 2015

(65) Prior Publication Data
US 2017/0153648 A1 Jun. 1, 2017

(51) Int. Cl.
G05D 1/02 (2006.01)
A01D 34/00 (2006.01)
B60L 11/18 (2006.01)

(52) U.S. Cl.
CPC ......... *G05D 1/0265* (2013.01); *A01D 34/008* (2013.01); *G05D 1/0276* (2013.01); *B60L 11/18* (2013.01); *B60L 11/1816* (2013.01); *B60L 2200/40* (2013.01); *B60L 2240/62* (2013.01); *B60L 2260/32* (2013.01); *G05D 2201/0208* (2013.01)

(58) Field of Classification Search
CPC ............... G05D 1/0265; G05D 1/0276; G05D 2201/0208; A01D 34/008; B60L 2240/62; B60L 11/18; B60L 11/1816; B60L 2200/40; B60L 2260/32
See application file for complete search history.

(56) References Cited

FOREIGN PATENT DOCUMENTS

| EP | 1906205 A1 | 4/2008 |
|---|---|---|
| EP | 2375301 A2 | 10/2011 |
| EP | 2684438 A1 | 1/2014 |
| WO | 03104908 A1 | 12/2003 |
| WO | 2010077198 A1 | 7/2010 |
| WO | 2011129728 A1 | 10/2011 |

OTHER PUBLICATIONS

International Search Report and Written Opinion of International Application No. PCT/SE2014/050121 mailed Sep. 26, 2014.

*Primary Examiner* — Anne M Antonucci
(74) *Attorney, Agent, or Firm* — McNair Law Firm, P.A.

(57) ABSTRACT

A robotic work tool system (200) comprising a signal generator (240), a boundary wire (250) and a robotic work tool (100), said boundary wire being adapted to demark a work area (205), said signal generator (240) being arranged to transmit a control signal (255) through said boundary wire (250), and said robotic work tool (100) comprising at least one sensor (170) for detecting said control signal (255) being transmitted through the boundary wire (250). The robotic work tool system (200) is characterized in that said pulse signal (255) comprises at least one first pulse train (256) being transmitted at a first amplitude (C1) and at least one second pulse train (257) being transmitted at a second amplitude (C2), wherein said first amplitude (C1) and second amplitude (C2) being arranged so that said first amplitude (C1) is greater than said amplitude level (C2) and a sum of the amplitudes (C1, C2) for all pulse trains (256, 257) over time falls below a threshold value.

14 Claims, 5 Drawing Sheets

ROBOTIC WORKING TOOL SYSTEM WITH A BOUNDARY WIRE

TECHNICAL FIELD

This application relates to a robotic work tool system for improved boundary detection, and in particular to a robotic work tool system for improved boundary detection allowing for an enlarged work area.

BACKGROUND

Many contemporary robotic working tools, such as robotic lawnmowers, are designed to work in a work area defined by a boundary wire through which a control signal is transmitted. The control signal will give rise to a magnetic field emanating from the boundary wire. As the magnetic field will have one polarity on one side of the boundary wire and a reverser polarity on an opposite side of the boundary wire, a robotic work tool will be able to determine when it crosses the boundary by detecting a shift in the polarity of the magnetic field. Furthermore, by knowing the time occurrence of a control signal, such as in a synchronized system, the robotic work tool will be able to determine an expected polarity of the sensed magnetic field and based on this determine if it is inside or outside a working area without having to cross the boundary wire. This is important from a safety perspective as it prevents a robotic work tool from being started outside a work area. It is also important that an robotic work tool is able to determine whether the boundary wire is active or not, that is whether a control signal is being transmitted through the boundary wire or not. To do this the robotic work tool must be able to continuously (possibly periodically) sense the magnetic field generated by the control signal to be able to determine that the control signal is active. If the robotic work tool would be allowed to operate without sensing the control signal, the robotic work tool would not be able to determine a failure of the boundary system and could possibly escape and cause damages to the surroundings of the work area.

It is therefore important that the robotic work tool is able to sense the magnetic field caused by the control signal all through the work area.

However, the European Parliament and Council Directive 1999/5/EC, also referred to as the Radio and Telecommunications (R&TTE) directive, has stipulated limitations to the allowed energy emitted from a magnetic field which restricts the maximum strength of a magnetic field which in turn limits the maximum allowed work area using one boundary wire. One option to increase a work area is to use several boundary wires each designating a boundary wire, which increases the cost of setting up a work area and installing a robotic work tool system.

There is thus a need for a robotic work tool system that is able to operate safely within a large work area without violating the R&TTE directive.

SUMMARY

It is an object of the teachings herein to provide a control signal wherein the amplitude of some pulses is increased to allow for remote detection while the amplitude of the remaining or some other pulses is decreased to lower the total energy mitted by a resulting magnetic field over time, thereby fulfilling the R&TTE directive.

It is an object of the teachings of this application to overcome the problems listed above by providing robotic work tool system comprising a signal generator, a boundary wire and a robotic work tool, said boundary wire being adapted to demark a work area, said signal generator being arranged to transmit a control signal through said boundary wire, and said robotic work tool comprising at least one sensor for detecting said control signal being transmitted through the boundary wire, characterized in that said pulse signal comprising at least one first pulse train being transmitted at a first amplitude and at least one second pulse train being transmitted at a second amplitude, wherein said first amplitude and second amplitude being arranged so that said first amplitude is greater than said amplitude level and a sum of the amplitudes for all pulse trains over time falls below a threshold value.

This enables the robotic work tool to sense at least one pulse (train) every now and then and thereby be able to determine that the boundary is active, while still fulfilling the R&TTE directive.

In one embodiment the robotic work tool is a robotic lawnmower. In one embodiment the robotic work tool 100 is a farming equipment. In one embodiment the robotic work tool 100 is a golf ball collecting tool. The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

It is also an object of the teachings of this application to overcome the problems listed above by providing method for use in a robotic work tool system comprising a signal generator, a boundary wire and a robotic work tool, said boundary wire being adapted to demark a work area, said signal generator being arranged to transmit a control signal through said boundary wire, and said robotic work tool comprising at least one sensor for detecting said control signal being transmitted through the boundary wire, said pulse signal comprising at least one first pulse train being transmitted at a first amplitude and at least one second pulse train being transmitted at a second amplitude, wherein said method comprises arranging said first amplitude and second amplitude so that said first amplitude is greater than said amplitude level and a sum of the amplitudes for all pulse trains over time falls below a threshold value.

The inventors of the present invention have realized, after inventive and insightful reasoning, that an robotic work tool only needs to detect a pulse (or pulse train) of the control signal intermittently to determine that the boundary is still active and by adapting the amplitude levels of individual pulses (or pulse trains) the average emitted energy can be maintained at a level that fulfils the R&TTE requirement while still enabling for the ROBOTIC WORK TOOL to detect a pulse periodically to enable it to determine that the boundary wire and the control signal are still active.

In one embodiment the amplitude level of the subsequent pulses may be adapted or manipulated by the controller of the robotic work tool or by a user. This enables the teachings herein to be used to save power, by adjusting output of the control signal.

The teachings herein can also be used to reduce the emissions of a robotic work tool system which is especially useful in situations or environments where other equipment sensitive to magnetic fields are used or placed.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
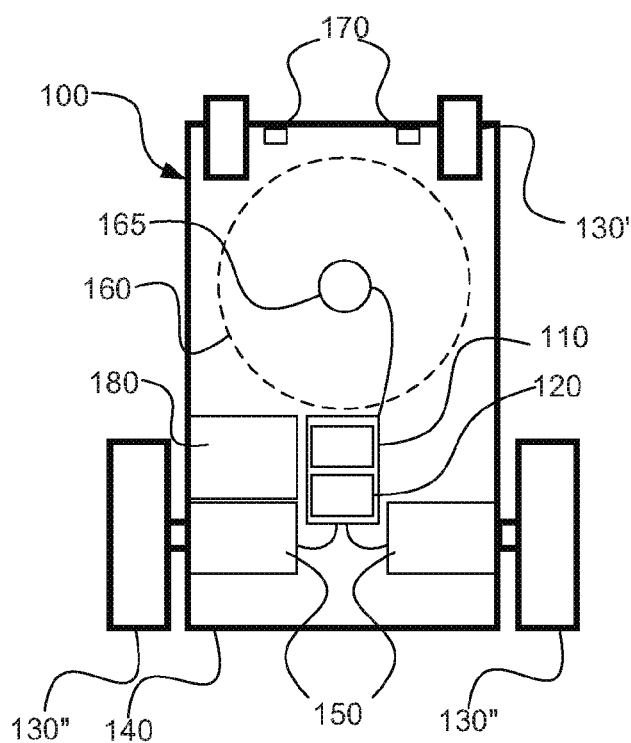
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further has at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The robotic work tool 100 is, in one embodiment, a robotic lawnmower.

The robotic work tool 100 also has (at least) one battery 180 for providing power to the motors 150 and the cutter motor 165. Connected to the battery 180 are two charging connectors, such as charging plates or charging rails adapted to establish an electrical connection with a corresponding charging connector (referenced 230 in FIG. 2) on a charging station (referenced 210 in FIG. 2) for receiving a charging current from a charger (referenced 220 in FIG. 2) of the charging station (referenced 210 in FIG. 2).

Figure 2:
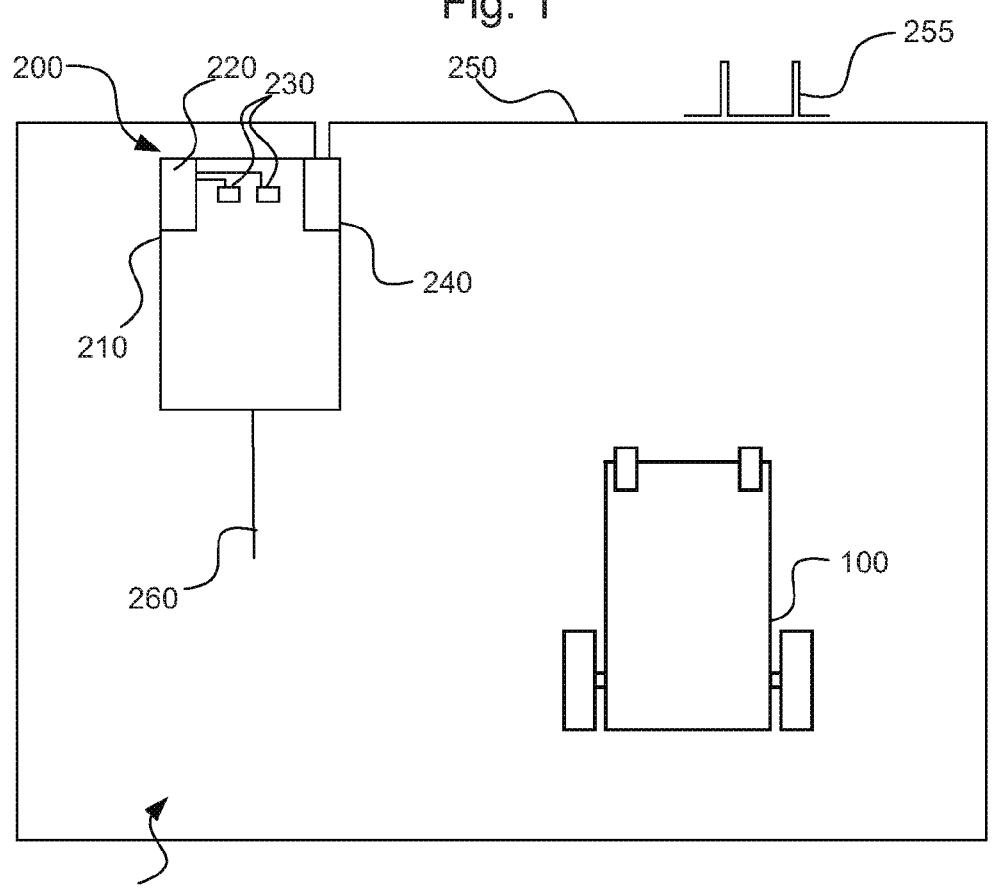
FIG. 2 shows a schematic view of a robotic working tool system according to one embodiment of the teachings of this application.

FIG. 2 shows a schematic view of a robotic working tool system 200 comprising a charging station 210 and a boundary wire 250 arranged to enclose a working area 205, the working area 205 not necessarily being a part of the robot system 200.

The robotic work tool 100 of FIG. 2 is a robotic work tool 100 such as disclosed with reference to FIG. 1. A charging station 210 has a charger 220 coupled to, in this embodiment, two charging connectors 230. The charging connectors 230 are arranged to co-operate with corresponding charging connectors 185 of the robotic work tool 100 for charging the battery 180 of the robotic work tool 100.

The charging station 210 also has, or may be coupled to, a signal generator 240 for providing a control signal 255 (for more details see FIG. 3) to be transmitted through the boundary wire 250. The control signal preferably comprises a number of periodic current pulses or pulse trains. In FIG. 2, an example control signal comprising pulses is shown for illustrative purposes, but it should be noted that the teachings herein is not limited to such control signals and can be also applied to other types of control signals. As is known in the art, the current pulses 255 will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robot to follow the boundary wire 250, for example when returning to the charging station 210 for charging.

Optionally, the charging station 210 also has a guide cable 260 for enabling the robot to find the entrance of the charging station 210. In one embodiment the guide cable 260 is formed by a loop of the boundary wire 250.

Figure 3:
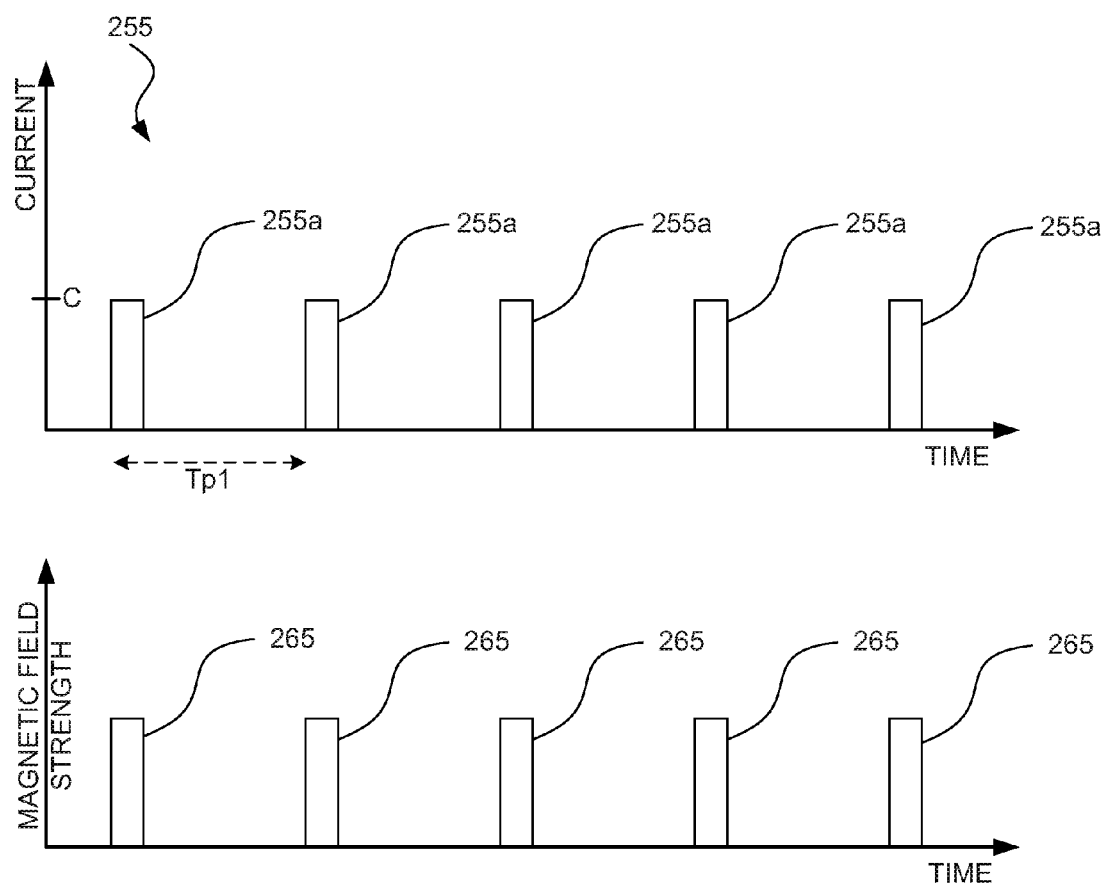
FIG. 3 shows an example of a control signal according to one embodiment of the teachings of this application.

FIG. 3 shows an example of a control signal 255, such as the control signal 255 of FIG. 2. As can be seen the example control signal 255 comprises a number of individual current pulses 255a that occur periodically over time, with a first time period Tp1.

The current pulses 255a will generate a magnetic field signal comprising magnetic spikes or pulses 265. Each current pulse 255a will generate a magnetic pulse 265. The magnetic pulse 265 will have a positive polarity on one side of the boundary wire 250 and with a negative polarity on the other side of the boundary wire 250 which will enable a robotic work tool 100 to determine on which side of the boundary wire 250 the robotic work tool 100 is. The amplitude or strength of the magnetic pulses 265 will correspond to the amplitude of the corresponding current pulse 255 as is known in the art.

The R&TTE directive limits the energy emitted by the magnetic field over time. In FIG. 3, as well as in FIGS. 4 and 5, the energy emitted by the magnetic pulses 265 is indicated by the area of the magnetic pulses 265.

By realizing that the energy emitted by the magnetic pulses corresponds to the amplitude of the current pulses 255a of the control signal 255 and that the R&TTE directive only limits the magnetic energy over time the magnetic energy can be controlled and manipulated so that strong current pulses 255a may be transmitted in the control signal 255 without violating the R&TTE directive if the strong current pulses are not transmitted too frequently.

Figure 4:
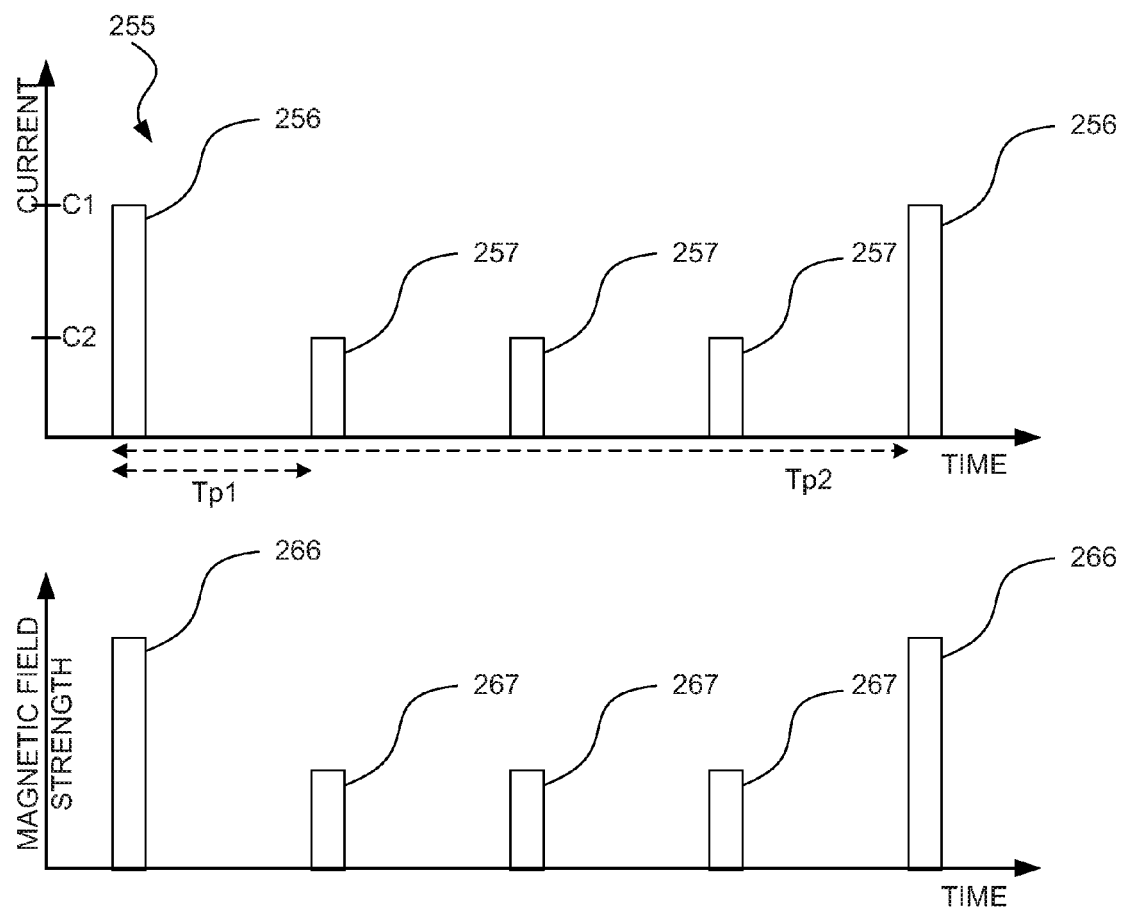
FIG. 4 shows an example of a control signal according to one embodiment of the teachings of this application.

FIG. 4 shows an example of an alternative control signal 255 comprising a first initial current pulse 256 followed by second subsequent current pulses 257. The initial current pulse 256 is repeated periodically with a second time period Tp2, wherein the second time period Tp2 is a multiple N of the first time period Tp1. The current pulses 256 and 257 generate corresponding magnetic pulses 266 and 267 respectively as is shown in FIG. 4. It should be noted that even though the first current pulse 256 is an initial current pulse in FIG. 4, the first current pulse 256 may be transmitted in any order during the second time period Tp2. It should also be noted that there may also be more than one first current pulse 256 in a second time period Tp2. The number of first current pulses 256 and second current pulses 257 in each time period Tp2 may be random as long as the emitted energy of the corresponding magnetic pulses falls below a threshold value, as will be discussed in further detail below.

As can be seen the initial current pulse 256 has an amplitude C1 that is greater than the amplitudes C2 of the subsequent current pulses 257. Correspondingly the amplitude of the resulting initial magnetic pulses 266 for the initial current pulse 256 is greater than the amplitudes of the resulting subsequent magnetic pulses 267 for the subsequent current pulses 257. As can be seen by comparing FIGS. 3 and 4 the energy emitted in the magnetic pulses 265 over time of FIG. 3 equals the energy emitted in the magnetic pulses 266 and 267 over time of FIG. 4. As has been discussed above, the energy emitted is proportional to the amplitude of the magnetic pulse integrated over time, which is illustrated as the area of the magnetic pulse and the magnetic pulses of FIG. 3 have an area that is equal to the magnetic pulses of FIG. 4 over the second time period Tp2.

One manner of calculating the amplitude levels of the pulses is given below with reference to FIGS. 3 and 4. For N pulses the initial pulse 256 is provided at an amplitude $C1=C\times(1+(N-1)/N)$; and the subsequent pulses 257 are provided at an amplitude $C2=C\times(N-1)/N$. In the illustrative example of FIGS. 3 and 4, N is 4, C is 4 units, C1 is 7 units and C2 is 3 units.

This has the benefit that some (the initial) current pulses 256 will be able to generate strong magnetic pulses 266 that a robotic work tool 100 will be able to sense at a great distance from the boundary wire, thereby allowing for larger working areas 205. The size of the resulting working area 205 depends on the actual current levels used and also the actual environment in and around the working area 205 and there are too many possibilities for giving specific examples without undue burden to the applicant of this application. However, as an example, to increase the amplitude from 40 V output voltage (peak-to-peak) to 70 V (the examples are for internal voltage levels in the signal generator) would result in a 75% increase of the work area 205 in which the resulting magnetic field can be sensed.

A further benefit is achieved in that a robotic work tool 100 will be able to determine that a boundary wire 250 is close at hand as the robotic work tool 100 starts to detect also the subsequent pulses 267. This enables the robotic work tool 100 to adapt its operation according to the distance to a boundary wire 250, such as for example slowing down or turning. Generally, a robotic work tool 100 arranged to operate in a random or semi random operating manner will spend less time in the outer parts of a work area 205 than in the centre of a work area 205. By being able to determine that the robotic work tool 100 is close to a boundary wire 250, the robotic work tool 100 may adapts operation so that more time is spent in the outer areas of the work area 205 thereby enabling for a more even treatment of the work area 205.

As it is difficult if not impossible for the robotic work tool system 200 to measure and determine the emitted energy of the generated magnetic fields, the robotic work tool 100 is configured to adapt the amplitude levels of the initial pulse 256 and the subsequent pulses 257 based on those amplitudes. The threshold values stipulated by the R&TTE directive can easily be translated into limitations for the pulse train amplitude. The exact translation depends on the first and second time periods as well as the pulse width, the pulse amplitude, the shape of the pulse and also the number of pulses in a pulse train.

The threshold value may be designed to be used for a simple sum of adding amplitude levels of the current pulses, or it may be designed to be used for a time sum (amplitude× time extension) for the current pulses. It should be noted that other manners of determining the sum of the amplitudes of the current pulses are also plausible.

In one embodiment the amplitude of the subsequent pulse 257 is set to correspond to a distance from the boundary wire. For example, an amplitude of 5 V may correspond to a distance of less than 1 meter from the boundary wire 250 and an amplitude of 10 V may correspond to a distance of about 2 meters from the boundary wire 250.

If the amplitude of the subsequent pulses 257 is set to be low, the robotic work tool may be arranged to determine that the boundary wire has been encountered when subsequent pulse is detected (or rather the magnetic field generated by the subsequent pulse is detected) and adapt its operation by turning away from the boundary wire 250. This enables the robotic work tool to turn even when not having actually crossed a boundary wire which allows for easier installation of the boundary wire 250 as space is no longer needed for allowing the robotic work tool 100 to cross the boundary wire and then turn back.

Figure 5:
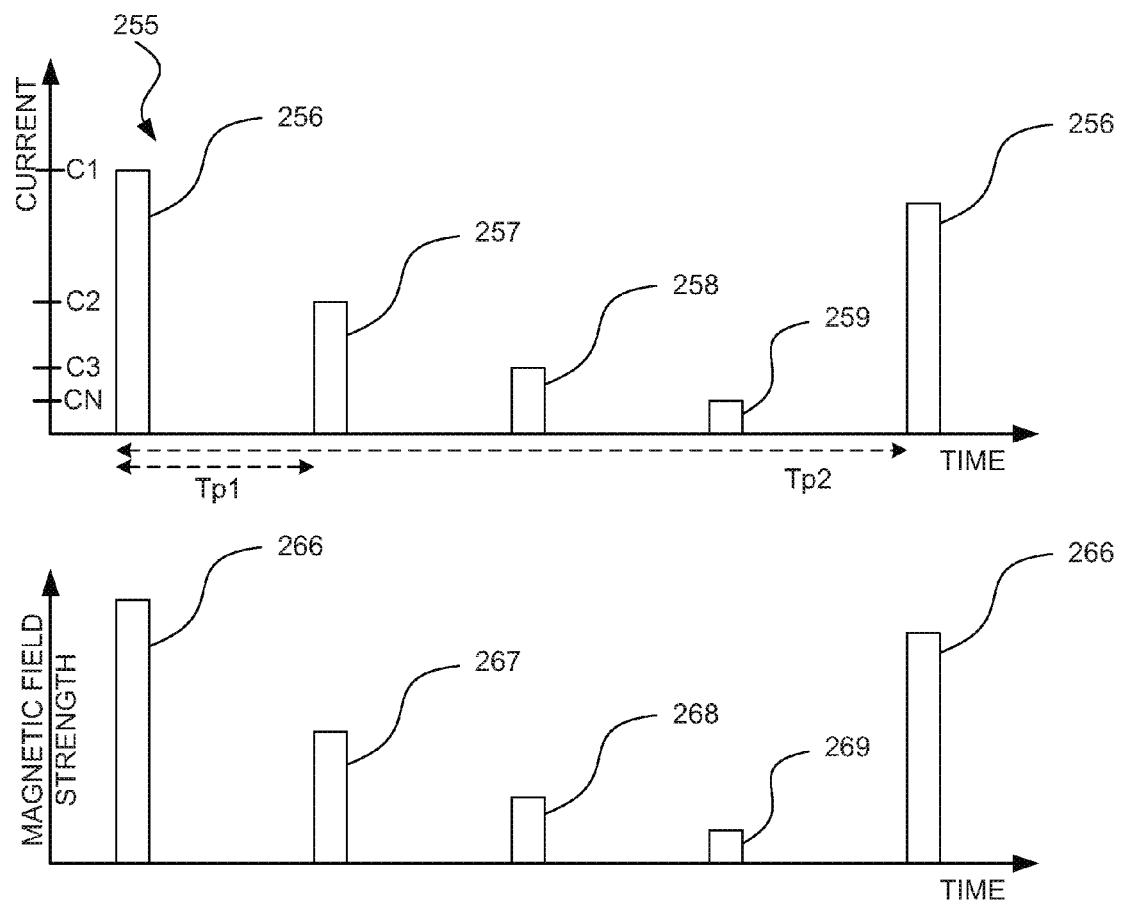
FIG. 5 shows an example of a control signal according to one embodiment of the teachings of this application.

FIG. 5 shows a further example of a control signal 255, wherein an initial current pulse 256 is followed by subsequent second and third (and fourth) current pulses 257, 258 and 259 having different amplitudes. The current pulses 256, 257, 258 and 259 generates corresponding magnetic pulses 266, 267, 268 and 269 having different amplitudes. The current pulses 256, 257, 258 and 259 may be spaced apart in time with the first time period Tp1 and repeated in time at the second time period Tp2. As can be seen in FIG. 5 and as indicated by the dashed boxes, the energy emitted by the magnetic pulses 266, 267, 268 and 269 is the same in FIG. 5 as in FIGS. 4 and 3 over time.

By adjusting the amplitude of each current pulse 256, 257, 258 and 259 in a current pulse set, the robotic work tool 100 will be able to determine its relative distance to a boundary wire 250 more closely and the robotic work tool 100 may adapt its operation accordingly. This also enables the work area 205 to be divided into several sectors or areas depending on the distance from a boundary wire.

Figure 6:
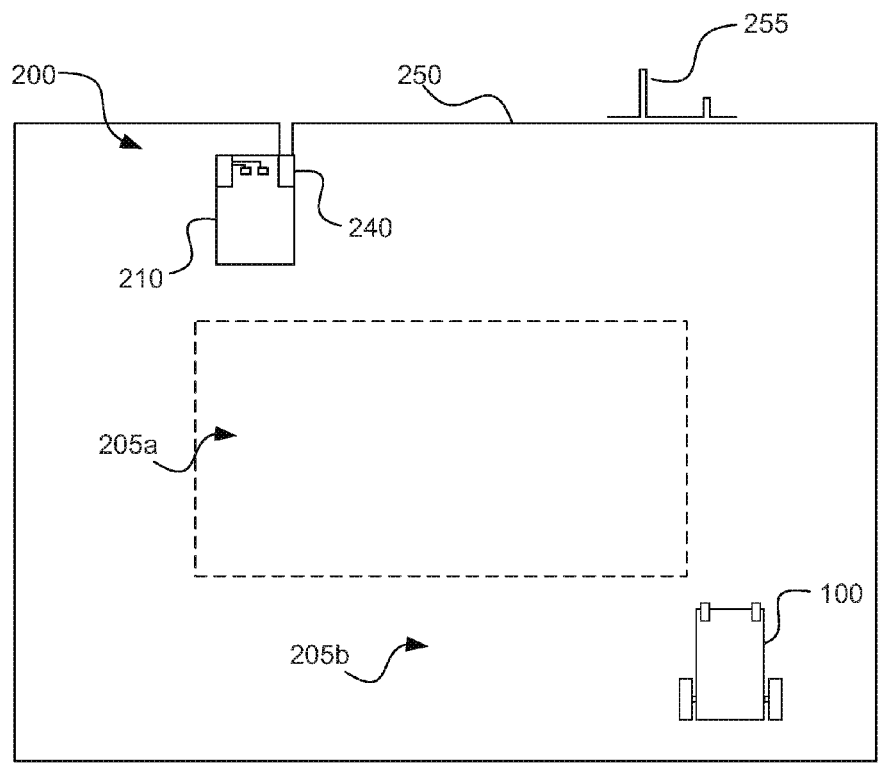
FIG. 6 shows a schematic view of a robotic working tool system according to one embodiment of the teachings of this application.

FIG. 6 shows an example of a robotic work tool system 200 wherein the signal generator is configured to transmit a control signal 255 having current pulses of two different amplitudes which will result in the robotic work tool 100 being able to discern between to sectors of the work area 205, an outer or perimeter work area 205*a* and an inner or centre work area 205*b*.

Figure 7:
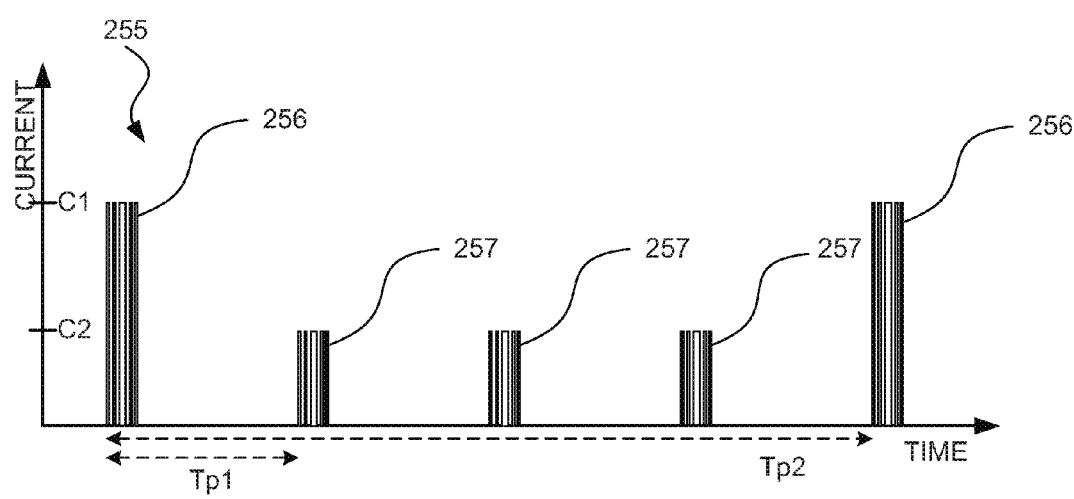
FIG. 7 shows an example of a control signal according to one embodiment of the teachings of this application.

FIG. 7 shows an example of a control signal 255 comprising periodic pulse trains 256 and 257, wherein each pulse train 256, 257 comprises more than one current pulse. The control signal 255 of FIG. 7 differs from the control signal 255 of FIG. 4 in that the short pulse trains 256, 257 are transmitted at periodic time intervals Tp1. The use of pulse trains enables for coded messages (such as control information) to be transmitted from the signal generator 240 the robotic work tool 100.

For the purposes of this application a pulse train will be taken to comprise one or more pulses and the control signals 255 of FIGS. 2, 3, 4, 5, 6 and 7 are thus all control signals 255 comprising pulse trains, wherein the pulse trains of the control signals 255 of FIGS. 3, 4 and 5 comprise one single pulse in each pulse train, and the pulse trains of the control signal 255 of FIG. 7 comprise 5 pulses in each pulse train.

In one embodiment a pulse train 256, 257, 258, 259 has a time extension equalling the first time period Tp1. In one embodiment a pulse train 256, 257, 258, 259 has a time extension that is shorter than the first time period Tp1.

In one embodiment the amplitude level of the subsequent pulses and possibly also the initial pulse may be adapted or manipulated by the controller 110 of the robotic work tool 100 or by a user to restrict the power used by the robotic work tool system 200.

It should be noted that although the teachings herein has been described with reference to periodic control signals it should be noted that the teachings may also be applied to aperiodic control signals. In such embodiments the transmitted amplitude level would be adjusted so that an average emitted magnetic energy would satisfy the R&TTE directive for the resulting magnetic fields.

It should also be noted that the teachings herein may also be for continuous control signals (both analogue and digital). In such embodiments the amplitude of the control signal is adapted over time so that the total energy emitted falls below a threshold value.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a signal generator, a boundary wire and a robotic work tool, said boundary wire being adapted to demark a work area, said signal generator being arranged to transmit a control signal through said boundary wire, and said robotic work tool comprising at least one sensor for detecting said control signal being transmitted through the boundary wire,
    wherein said control signal comprising at least one first pulse train being transmitted at a first amplitude and at least one second pulse train being transmitted at a second amplitude,
    wherein said first amplitude and second amplitude are arranged so that said first amplitude is greater than said second amplitude and a sum of the first and second amplitudes for all pulse trains over time falls below a threshold value.

2. The robotic work tool system according to claim 1, wherein said control signal further comprises at least one third pulse train being transmitted at a third amplitude, wherein said third amplitude is arranged so that said third amplitude is lower than said second amplitude and a sum of the first, second and third amplitudes for all pulse trains over time falls below said threshold value.

3. The robotic work tool system according to claim 1, wherein said robotic work tool is configured to determine if said second pulse train is detected and, based on detection of the second pulse train, determine a distance to the boundary wire.

4. The robotic work tool system according to claim 1, wherein said robotic work tool is configured to determine if said second pulse train (257) is detected and, based on detection of the second pulse train, adapt operation of the robotic work tool.

5. The robotic work tool system according to claim 1, wherein said work area comprises a first work area sector and a second work area sector and the robotic work tool is configured to determine whether a subsequent pulse (257, 258, 259) is detected, and based on detection of the subsequent pulse, determine whether the robotic work tool is currently operating in said first work area sector or said second work area sector.

6. The robotic work tool system according to claim 1, wherein a pulse train comprises one pulse.

7. The robotic work tool system according to claim 1, wherein a pulse train comprises several pulses.

8. The robotic work tool system according to claim 1, wherein said robotic work tool is configured to determine the sum of the amplitude signals over a second time period.

9. The robotic work tool system according to claim 1, wherein said control signal is periodic.

10. The robotic work tool system according to claim 1, wherein said control signal is aperiodic.

11. The robotic work tool system according to claim 1, wherein said threshold value corresponds to a threshold value for energy emitted by magnetic pulses being generated by the control signal.

12. The robotic work tool system according to claim 1, wherein said first and second amplitudes of an initial pulse or subsequent pulses are adapted by said robotic work tool.

13. The robotic work tool system according to claim 12, wherein said robotic work tool is configured to receive an adjustment of said first and second amplitudes of said initial pulse or said subsequent pulses and adapt said amplitude levels accordingly.

14. A method for use in a robotic work tool system comprising a signal generator, a boundary wire and a robotic work tool, said boundary wire being adapted to demark a work area, said signal generator being arranged to transmit a control signal through said boundary wire, and said robotic work tool comprising at least one sensor for detecting said control signal being transmitted through the boundary wire, said control signal comprising at least one first pulse train being transmitted at a first amplitude and at least one second pulse train being transmitted at a second amplitude, wherein said method comprises arranging said first amplitude is greater than said second amplitude and a sum of the first and second amplitudes for all pulse trains over time falls below a threshold value.

* * * * *